US010812960B2

United States Patent
Weinfield

(10) Patent No.: US 10,812,960 B2
(45) Date of Patent: Oct. 20, 2020

(54) EMERGENCY COMMUNICATIONS SYSTEM FOR VEHICLE

(71) Applicant: DENSO International America, Inc., Southfield, MI (US)

(72) Inventor: Aaron Weinfield, Encinitas, CA (US)

(73) Assignee: DENSO International America, Inc., Southfield, MI (US)

( * ) Notice: Subject to any disclaimer, the term of this patent is extended or adjusted under 35 U.S.C. 154(b) by 381 days.

(21) Appl. No.: 15/901,247

(22) Filed: Feb. 21, 2018

(65) Prior Publication Data

US 2019/0261152 A1 Aug. 22, 2019

(51) Int. Cl.
| | |
|---|---|
| *H04W 4/44* | (2018.01) |
| *G05D 1/00* | (2006.01) |
| *H04W 4/90* | (2018.01) |
| *B64C 39/02* | (2006.01) |
| *G05D 1/02* | (2020.01) |
| *H04B 7/185* | (2006.01) |
| *B64F 1/22* | (2006.01) |

(52) U.S. Cl.
CPC ............. *H04W 4/90* (2018.02); *B64C 39/024* (2013.01); *B64F 1/222* (2013.01); *G05D 1/0202* (2013.01); *H04B 7/18504* (2013.01); *H04W 4/44* (2018.02); *B64C 2201/122* (2013.01); *B64C 2201/127* (2013.01); *B64C 2201/208* (2013.01)

(58) Field of Classification Search
CPC . H04W 4/90; H04W 4/44; B64F 1/222; B64F 1/007; H04B 7/18504; G05D 1/0202; G05D 1/0055; B64C 39/024; B64C 2201/208; B64C 2201/127; B64C 2201/122; B64C 2201/145; B64D 47/08
See application file for complete search history.

(56) References Cited

U.S. PATENT DOCUMENTS

| | | | | |
|---|---|---|---|---|
| 2016/0364989 | A1* | 12/2016 | Speasl | G06Q 10/08 |
| 2017/0086048 | A1* | 3/2017 | Cho | G05D 1/101 |
| 2017/0225781 | A1* | 8/2017 | Almasoud | G08G 5/0069 |
| 2019/0061663 | A1* | 2/2019 | Benmimoun | H04N 7/185 |

* cited by examiner

*Primary Examiner* — Genna M Mott
(74) *Attorney, Agent, or Firm* — Harness, Dickey & Pierce, P.L.C.

(57) ABSTRACT

An emergency communication system for a vehicle. The system includes a drone docking station configured to be mounted to a vehicle. An aerial drone is configured to be docked to the docking station and released from the docking station when the vehicle is disabled and/or a driver is incapacitated at a location that is out of range of communication with emergency authorities.

17 Claims, 3 Drawing Sheets

EMERGENCY COMMUNICATIONS SYSTEM FOR VEHICLE

FIELD

The present disclosure relates to an emergency communications system for a vehicle including one or more drones, which are dispatched from the vehicle to relay communications to emergency authorities when the vehicle itself is out of range of communication with emergency authorities.

BACKGROUND

This section provides background information related to the present disclosure, which is not necessarily prior art.

While cellular and other voice/data coverage is widely available, there are still many areas that lack such coverage, particularly rural areas. A problem thus arises when a vehicle becomes disabled and/or a driver becomes incapacitated (e.g., the vehicle runs off the road, hits an object or animal, rolls over, encounters engine trouble, has a flat tire, etc.; and/or the driver falls asleep, loses consciousness, etc.) in an area that does not have cellular or other voice/data coverage available, and no one is in the area to assist. As a result, vehicle occupants may be unable to obtain assistance when they need it most. Current emergency systems are limited to flashing the vehicle's lights and/or sounding the vehicle's horn in an effort to make the distressed vehicle noticeable to others to illicit assistance. There is thus a need in the art for an improved emergency assistance system for requesting assistance to a vehicle that is in an area where cellular or other voice/data coverage is unavailable. The present disclosure provides for an emergency communication system that addresses these needs in the art, as well as numerous others, as explained herein and as one skilled in the art will recognize.

SUMMARY

This section provides a general summary of the disclosure, and is not a comprehensive disclosure of its full scope or all of its features.

The present disclosure provides for an emergency communication system for a vehicle. The system includes a drone docking station configured to be mounted to a vehicle. An aerial drone is configured to be docked to the docking station and released from the docking station when the vehicle is disabled and/or a driver is incapacitated at a location that is out of range of communication with emergency authorities.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 1:
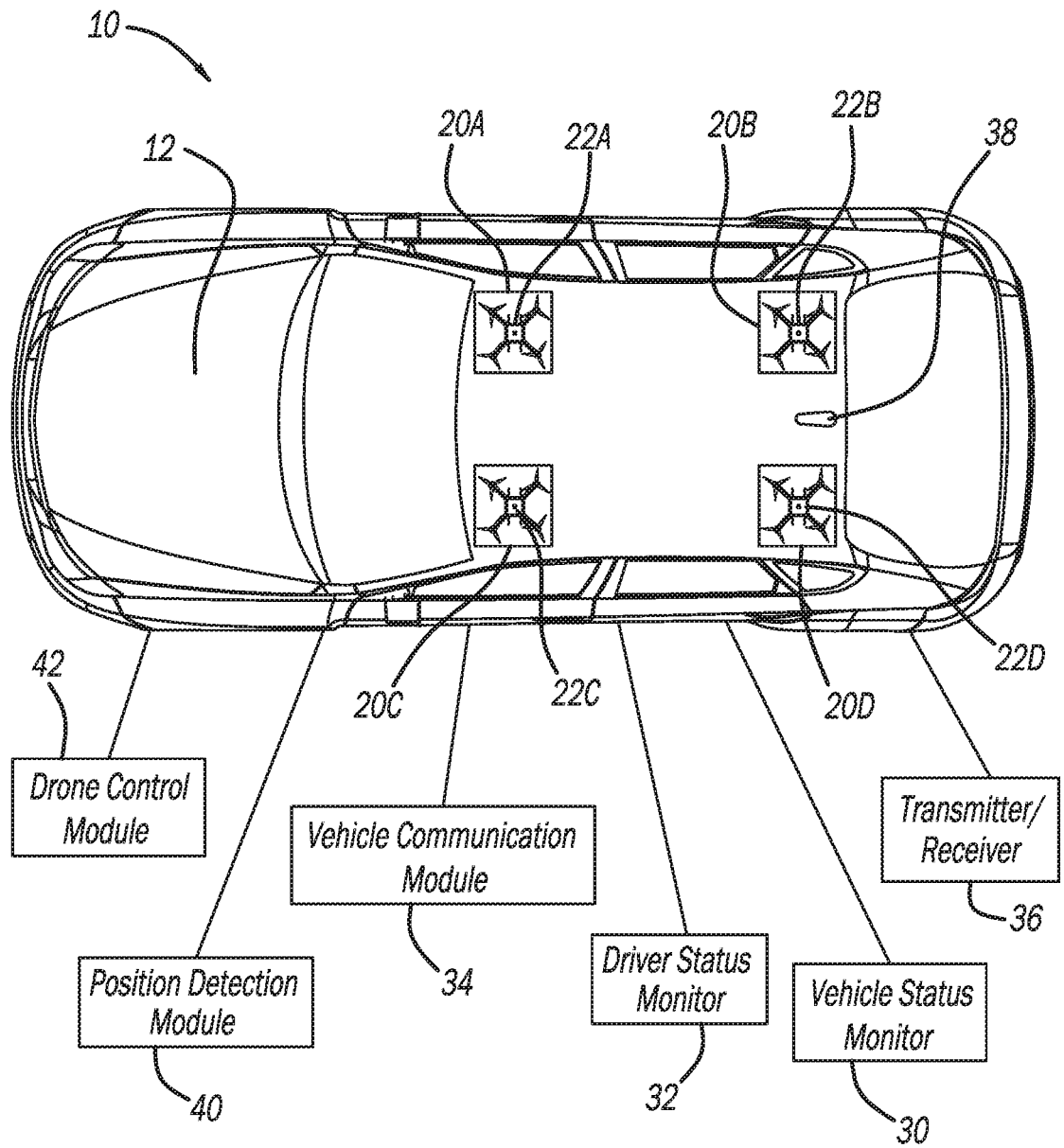
Figure 2:
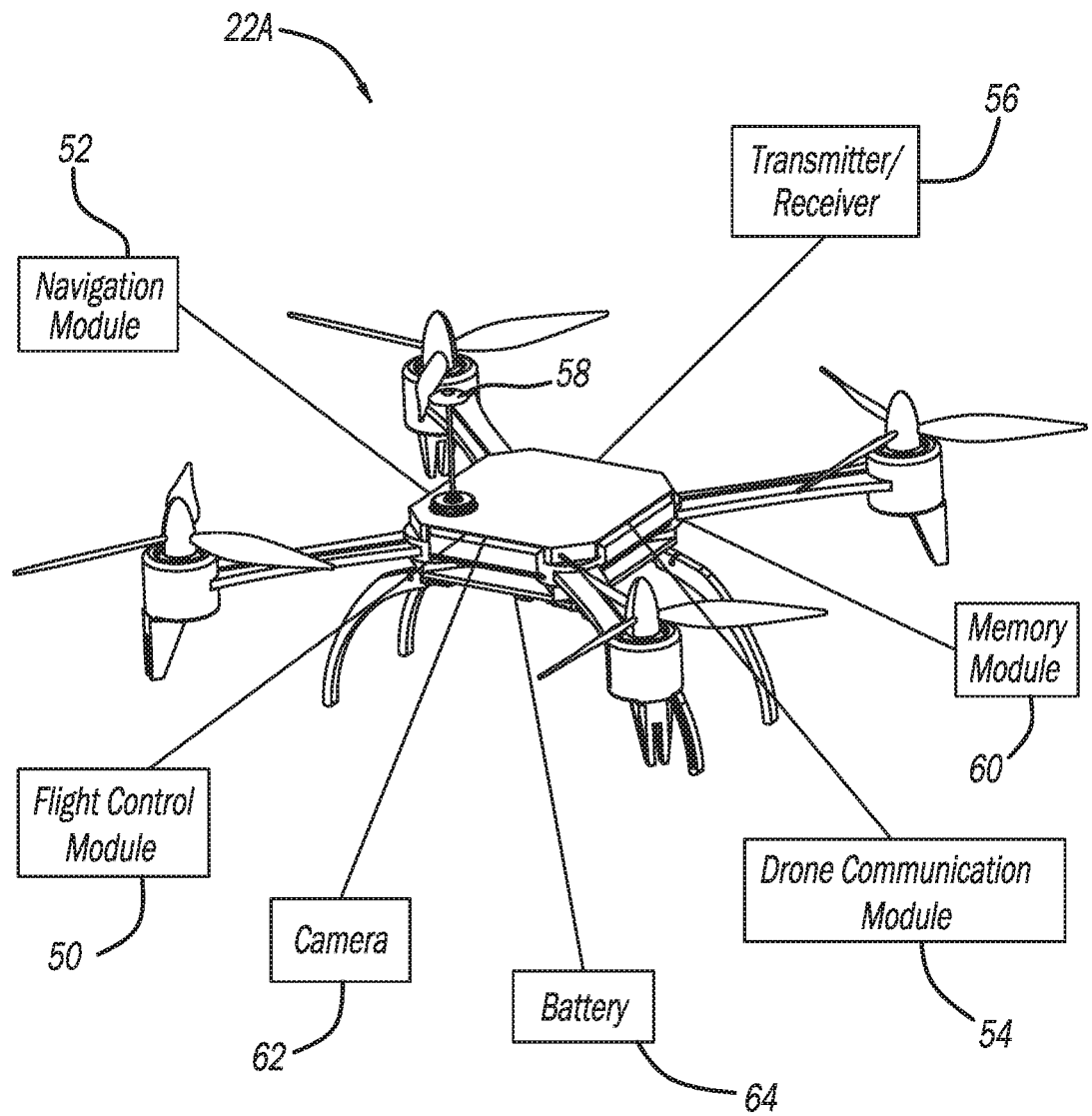
Figure 3:
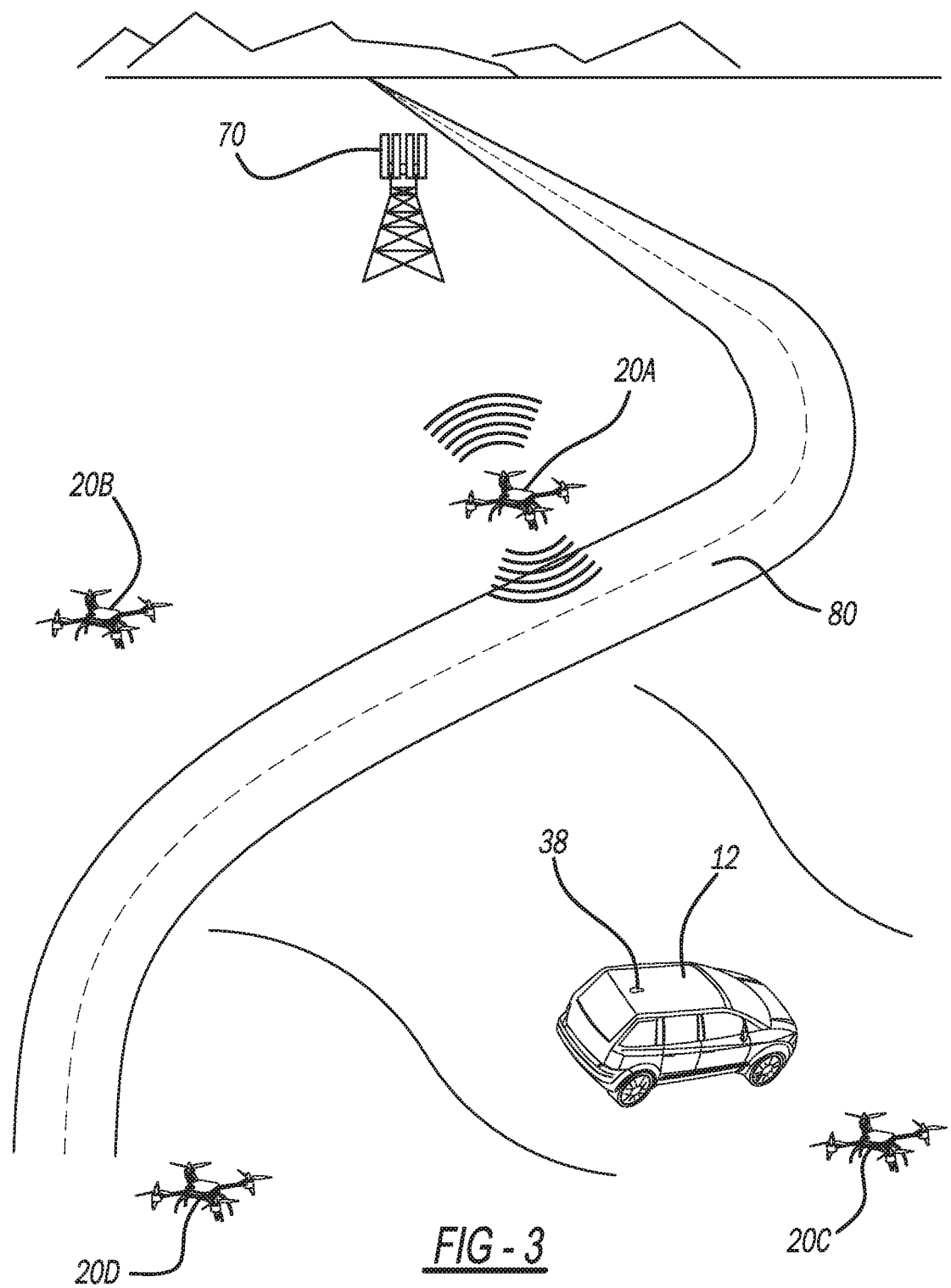

FIG. 1 illustrates an emergency communication system installed in an exemplary vehicle;

FIG. 2 is a perspective view of an aerial drone of the emergency communication system of FIG. 1; and FIG. 3 illustrates an exemplary use of the emergency communication system of FIG. 1, whereby an aerial drone launched from the vehicle transmits a distress message to emergency authorities by way of a communication tower, the vehicle having become disabled upon driving off of a road into a ditch in an area that is out of range of communication with the communication tower.

Corresponding reference numerals indicate corresponding parts throughout the several views of the drawings.

DETAILED DESCRIPTION

Example embodiments will now be described more fully with reference to the accompanying drawings.

FIG. 1 illustrates an emergency communication system 10 in accordance with the present disclosure installed in an exemplary vehicle 12. Although the vehicle 12 is illustrated as a sport utility vehicle (SUV), the vehicle 12 may be any other suitable type of vehicle, such as any suitable passenger vehicle, commercial vehicle, construction equipment/vehicle, mining vehicle/equipment, bus, train, any other mass transit vehicle, recreational vehicle, aircraft, watercraft, etc.

The system 10 includes one or more drone docking stations configured to be mounted at any suitable position about the vehicle 12, such as at any one or more of the following exemplary locations: roof; bumper; hood; trunk; vehicle undersurface; and/or roof rack. Any suitable number of aerial drone docking stations may be included. In the example of FIG. 1, the system 10 includes four drone docking stations 20A, 20B, 20C, and 20D arranged at a roof of the vehicle 12. Each one of the drone docking stations 20A, 20B, 20C, and 20D is configured to dock and charge any suitable aerial drone 22A, 22B, 22C, and 22D respectively. The drones 22A-22D can be any suitable aerial drones including the features described herein. In some applications, the aerial drones 22A-22D are small in size, such as only two or three inches to allow them to be hidden (or at least difficult to see) when not in use.

With continued reference to FIG. 1, the system 10 further includes a vehicle status monitor 30, a driver status monitor 32, a vehicle communication module 34, a vehicle transmitter/receiver 36, a vehicle antenna 38, a position detection module 40, and a drone control module 42. In this application, including the definitions below, the terms "module," "monitor," and "controller" may be replaced with the term "circuit." The terms "module," "monitor," and "controller" may refer to, be part of, or include processor hardware (shared, dedicated, or group) that executes code and memory hardware (shared, dedicated, or group) that stores code executed by the processor hardware. The code is configured to provide the features of the modules, monitors, controllers, and systems described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The vehicle status monitor 30 is configured to be installed in the vehicle 12, and is any suitable system including any suitable detectors and modules configured to identify when the vehicle 12 has become disabled. For example, the vehicle status monitor 30 may include any suitable collision detection sensors and/or airbag deployment detectors configured to identify when the vehicle 12 has been involved in a collision. The vehicle status monitor 30 may also include any suitable rollover detection sensor configured to identify when the vehicle 12 has rolled over. Furthermore, the vehicle status monitor 30 may include an engine status sensor configured to determine when the engine of the vehicle 12 is disabled. The vehicle status monitor 30 can also be configured to determine when autonomous drive functionality of the vehicle 12 is inoperable. The driver status monitor 32 includes any suitable sensors and/or modules configured to monitor the status of the driver of the vehicle 12, and determine when the driver has become incapacitated. For example, the driver status monitor 32 is configured to determine when the driver falls asleep, loses consciousness, or otherwise becomes unable to operate the vehicle 12.

The vehicle communication module 34 is configured to operate the transmitter/receiver 36 to transmit and receive signals by way of the antenna 38, each of which are configured to be mounted to the vehicle 12 at any suitable locations thereof. The signals can be any suitable voice and/or data signals in accordance with any suitable transmission protocol. For example, the vehicle communication module 34, the transmitter/receiver 36, and the antenna 38 can be configured to transmit and receive radio frequency signals between the vehicle 12 and the aerial drones 22A-22D, as well as between the vehicle 12 and any suitable roadside communication tower, such as the tower 70 illustrated in FIG. 3. As described further herein, the vehicle communication module 34 is configured to determine when the vehicle 12 is out of range of communication with emergency authorities, such as by way of the communication tower 70, and use one or more of the drones 22A-22D to relay communications to and from the communication tower 70 when the drones 22A-22D are airborne.

The position detection module 40 is configured to be mounted to the vehicle 12 at any suitable location. The position detection module 40 is configured to determine the position of the vehicle 12 in any suitable manner, such as with any suitable GPS or GNSS system. The position detection module 40 is in cooperation with the vehicle communication module 34 to determine the position of the vehicle 12 when the vehicle 12 is no longer in communication with emergency authorities (by way of the communication tower 70 of FIG. 3, for example), and consequently determine the location where the vehicle 12 was last in communication with emergency authorities (by way of the communication tower 70 of FIG. 3, for example). The drone control module 42 is configured to control the drone docking stations 20A-20D to release the aerial drones 22A-22D, and launch the aerial drones 22A-22D when the vehicle 12 is disabled (and/or the driver is incapacitated), and the vehicle 12 is at a location that is out of range of communication with emergency authorities, such as by way of communication tower 70 (FIG. 3), as described in further detail herein.

FIG. 2 illustrates the aerial drone 22A in greater detail. The aerial drone 22A is similar to, or the same as, the aerial drones 22B, 22C, and 22D. Therefore, the description of aerial drone 22A also describes the aerial drones 22B, 22C, and 22D. The aerial drone 22A includes a flight control module 50, a navigation module 52, a drone communication module 54, a transmitter/receiver 56, an antenna 58, a memory module 60, and a camera 62.

The flight control module 50 is configured to control the flight operations of the drone 22A to fly the drone 22A as commanded by the navigation module 52. The navigation module 52 is configured to monitor the position of the drone 22A in any suitable manner, based on GPS coordinates for example. The navigation module 52 is further configured to receive destination and/or route coordinates from any suitable source, such as the drone control module 42 of the vehicle 12 as described herein, and instruct the flight control module 50 to pilot the drone 22A along the route and/or to the destination.

The drone communication module 54 operates the transmitter/receiver 56 to transmit and/or receive signals by way of the antenna 58. The drone communication module 54, the transmitter/receiver 56, and the antenna 58 can be configured to transmit and receive any suitable signals, such as any suitable radio frequency signals, including any suitable cellular signals, vehicle-to-vehicle signals, vehicle-to-infrastructure signals, etc. The memory module 60 can be any suitable memory module configured to store security certificates for insuring that messages transmitted from the drone 22 are trusted by a recipient, such as emergency authorities. The memory module 60 is further configured to store the location of the disabled vehicle 12, pictures of the area about the vehicle 12 captured by the camera 62, the last known position of the vehicle 12 when it was in range of communication with emergency authorities (i.e., in contact with network coverage), and any other information that may be useful to emergency authorities. The battery 64 is configured to power the drone 22A, and may be any suitable battery capable of powering the aerial drone 22A for a flight of at least five miles one way, for example.

With continued reference to FIGS. 1 and 2, and additional reference to FIG. 3, exemplary operation of the system 10 will now be described in further detail. FIG. 3 illustrates the vehicle 12 in an exemplary disabled condition, in a ditch alongside of a road 80. The vehicle status monitor 30 is configured to detect that the vehicle 12 has become disabled in any suitable manner. For example, the vehicle status monitor 30 will identify the vehicle 12 as disabled upon detection of one or more of the following: airbag deployment; detection of an impact by an impact detection sensor; detection of one or more flat tires by one or more tire pressure detection sensors; detection of an engine failure by any suitable engine sensor(s); etc. The driver status monitor 32 will identify the vehicle 12 as disabled upon detection of the driver being asleep or otherwise incapacitated. The system 10 may also include a user interface (e.g., emergency button), which the driver may use to inform the system that he/she, and/or the vehicle 12, have become incapacitated and emergency assistance is needed. The system 10 will subsequently launch the drones 22A-22D as explained below if the vehicle 12 is in a location out of range of communication with emergency authorities.

The vehicle status monitor 30 and/or the driver status monitor 32 will generate one or more inputs to the vehicle communication module 34 informing the vehicle communication module 34 that the vehicle and/or the driver is incapacitated. The vehicle communication module 34 will then attempt to communicate with emergency authorities to summon assistance. The vehicle communication module 34 will operate the transmitter/receiver 36 to attempt to transmit a distress message to emergency authorities by way of the antenna 38 in any suitable manner, such as by cellular communication to a communication tower 70. If the vehicle communication module 34 determines that the vehicle 12 is out of range of communication with emergency authorities by way of the communication tower 70 or any other means of communication, the vehicle communication module 34 will inform the drone control module 42.

The drone control module 42 will retrieve a distress message from the vehicle communication module 34, which will include the current position of the vehicle 12 as determined by the position detection module 40. During normal operation of the vehicle 12, the vehicle communication module 34 continuously attempts to communicate with communication towers; and in cooperation with the position detection module 40, the vehicle communication module 34 is configured to identify the position of the vehicle 12 where the vehicle 12 was last in communication with, for example, a communication tower, such as the tower 70. The position of the vehicle 12 where the vehicle 12 was last in communication with the communication tower 70 is also input to the drone control module 42. The drone control module 42 inputs the distress message, the current position of the vehicle 12, and the position of the vehicle 12 where the vehicle 12 was last in communication with the communication tower 70 to the drones 22A, 22B, 22C, and 22D.

The drone control module 42 then controls the drone docking stations 20A-20D to release the aerial drones 22A-22D, and the drone control module 42 instructs the flight control modules 50 (such as by way of communication between the vehicle communication module 34 and the drone communication module 54) to launch one or more of the aerial drones 22A-22D from the vehicle 12. The launched drones 22A-22D are guided by their navigation modules 52 to fly one or more of the drones 22A-22D to a location where one or more of the drones 22A-22D is able to communicate with emergency authorities, such as by way of the exemplary communication tower 70. For example, the drone control module 42 may instruct one or more of the flight control modules 50 to fly one or more of the aerial drones 22A-22D to the location where the vehicle 10 was last in range of the exemplary communication tower 70 (or any other communication means allowing the vehicle communication module 34 to communicate with emergency authorities). The drone control module 42 can be configured to instruct the flight control modules 50 of the different drones 22A-22D to fly in different directions to improve chances of locating a reliable coverage area (such as within range of communication tower 70) to send the distress message to emergency authorities. The drone control module 42 may also instruct the flight control modules 50 to fly one or more of the drones 22A-22D to an area (or areas) known to be within communication range of emergency authorities, such as within communication range of one or more of the communication towers 70, based on map data stored in the memory modules 60.

Once a drone 22A-22D is within range of communication with emergency authorities (such as by way of the communication tower 70) the drone communication module 54 will transmit the distress message by way of the transmitter 56 and the antenna 58. If any of the drones 22A-22D are in range of both the vehicle 12 and the communication tower 70, the drones 22A-22D can provide two-way communication between the vehicle communication module 34 and emergency authorities, such as by way of the communication tower 70. Two or more of the drones 22A-22D may be arranged between the vehicle 12 and the communication tower 70 to effectively extend the range of the drones 22A-22D to provide two-way communication between the vehicle communication module 34 and the communication tower 70.

The present disclosure thus advantageously provides for an emergency communication system for a disabled vehicle that is out of range of communication with emergency authorities. The system 10 includes drone docking stations 20A-20D configured to be mounted to the vehicle 12. The plurality of aerial drones 22A-22D are configured to be docked to the docking stations 20A-20D and released from the docking stations 20A-20D by the drone control module 42. One or more of the drones 22A-22D is flown to an area within range of emergency authorities, such as by way of the communication tower 70. Once in range, one or more of the drones 22A-22D transmits a distress signal to emergency authorities including the location of the vehicle 12, as well as any other relevant information, such as a photograph of the vehicle 12 and the area surrounding the vehicle 12 taken by the camera 62 of one or more of the drones 22A-22D. The drones 22A-22D may also provide two-way communication between the vehicle 12 and emergency authorities, such as by way of the communication tower 70. Thus, even when the vehicle 12 is out of range of communicating directly with emergency authorities, the aerial drones 22A-22D advantageously fly to an area where communication with emergency authorities is possible in order to summon assistance to the vehicle 12.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An emergency communication system for a vehicle comprising:
   a driver status monitor configured to monitor a driver of the vehicle and determine when the driver is incapacitated;
   a drone docking station configured to be mounted to the vehicle;
   an aerial drone configured to be docked to the docking station and released from the docking station when the driver is incapacitated, as determined by the driver status monitor, at a location that is out of range of communication with emergency authorities; and
   a position detection module for the vehicle in cooperation with a vehicle communication module, wherein the position detection module is configured to identify a location where a transmitter of the vehicle was last in range of communication with emergency authorities and input the location to a drone control module, and the drone control module is configured to command a flight control module of the aerial drone to fly the aerial drone to the location.

2. The emergency communication system of claim 1, further comprising the drone control module configured to instruct the drone docking station to release the aerial drone when the driver is incapacitated.

3. The emergency communication system of claim 1, wherein:
   the drone includes the flight control module and a navigation control module configured to fly the aerial drone to a location where the aerial drone is able to communicate with emergency authorities; and
   the aerial drone includes a drone communication module and a transmitter configured to transmit a distress message to the emergency authorities.

4. The emergency communication system of claim 3, wherein:
   the aerial drone further includes a receiver; and
   the drone communication module, the transmitter of the drone, and the receiver are configured to relay communication between the vehicle communication module configured for the vehicle and emergency authorities.

5. The emergency communication system of claim 3, wherein the distress message includes a location of the vehicle.

6. The emergency communication system of claim 3, wherein:
   the aerial drone further includes a camera; and
   the distress message includes a picture of the disabled vehicle and an area about the disabled vehicle taken by the camera of the drone.

7. The emergency communication system of claim 2, wherein:
   the docking station is one of a plurality of docking stations configured to be mounted to the vehicle;
   the aerial drone is one of a plurality of aerial drones each configured to be mounted to different ones of the plurality of dockings stations; and
   the drone control module is configured to release the plurality of aerial drones from the plurality of docking stations when the driver is incapacitated, and command control modules of each one of the plurality of drones to fly the plurality of drones away from the vehicle in different directions.

8. The emergency communication system of claim 1, wherein the drone docking station is configured to be mounted to at least one of the following locations of the vehicle: a roof; a bumper; a hood; a trunk; a vehicle undersurface; and a roof rack.

9. The emergency communication system of claim 1, wherein the aerial drone further includes:
   a navigation module with maps of areas that are in range of communication with emergency authorities; and
   the flight control module configured to fly the aerial drone to one of the areas that is in range of communication with emergency authorities.

10. An emergency communication system for a vehicle comprising:
    a driver status monitor configured to monitor a driver of the vehicle and determine when the driver is incapacitated;
    a drone docking station configured to be mounted to the vehicle;
    an aerial drone configured to be docked to the docking station and released from the docking station when the vehicle is disabled at a location that is out of range of communication with emergency authorities;
    a drone control module included with the aerial drone and configured to instruct the aerial drone docking station to release the aerial drone when the driver is incapacitated, as determined by the driver status monitor, at a location out of range of communication with emergency authorities;

a flight control module included with the aerial drone and a navigation control module included with the aerial drone configured to fly the aerial drone to where the aerial drone is able to communicate with emergency authorities to transport a distress message thereto; and a position detection module for the vehicle in cooperation with a vehicle communication module, wherein the position detection module is configured to identify a location where a transmitter of the vehicle was last in range of communication with emergency authorities and input the location to the drone control module, and the drone control module is configured to command the flight control module of the aerial drone to fly the aerial drone to the location.

11. The emergency communication system of claim 10, wherein:

the aerial drone further includes a receiver, a drone communication module, and a transmitter; and the drone communication module, the transmitter of the drone, and the receiver are configured to relay communication between the vehicle communication module configured for the vehicle and emergency authorities.

12. The emergency communication system of claim 10, wherein the distress message includes a location of the vehicle.

13. The emergency communication system of claim 10, wherein:

the aerial drone further includes a camera; and the distress message includes a picture of the disabled vehicle and an area about the disabled vehicle taken by the camera of the drone.

14. The emergency communication system of claim 10, wherein:

the docking station is one of a plurality of docking stations configured to be mounted to the vehicle;

the aerial drone is one of a plurality of aerial drones each configured to be mounted to different ones of the plurality of dockings stations; and the drone control module is configured to release the plurality of aerial drones from the plurality of docking stations when the driver status monitor determines that the driver is incapacitated and command control modules of each one of the plurality of drones to fly the plurality of drones away from the vehicle in different directions.

15. The emergency communication system of claim 10, wherein the drone docking station is configured to be mounted to at least one of the following locations of the vehicle: a roof; a bumper; a hood; a trunk; a vehicle undersurface; and a roof rack.

16. The emergency communication system of claim 10, wherein the aerial drone further includes a navigation module with maps of areas that are in range of communication with emergency authorities; and the flight control module configured to fly the aerial drone to one of the areas that is in range of communication with emergency authorities.

17. An emergency communication system for a vehicle comprising:

a drone docking station configured to be mounted to a vehicle;

an aerial drone configured to be docked to the docking station;

a drone control module of the vehicle configured to instruct the drone docking station to release the aerial drone when the vehicle is disabled and/or the driver is incapacitated;

a flight control module and a navigation control module of the aerial drone configured to fly the aerial drone;

a vehicle communication module configured to communicate with emergency authorities by way of a transmitter/receiver of the vehicle, and monitor strength of communication with the emergency authorities; and a vehicle position detection module configured to track movement of the vehicle, the vehicle position detection module is in cooperation with the vehicle communication module, when the vehicle is out of range of communication with the emergency authorities, the vehicle position detection module identifies a location where the vehicle was last in range of communication with the emergency authorities and inputs the location to the drone control module;

wherein when the vehicle is disabled and/or the driver is incapacitated out of range of communication with emergency authorities, the drone control module is configured to instruct the drone docking station to release the aerial drone and command the flight control module of the aerial drone to fly the aerial drone to the location where the transmitter/receiver of the vehicle was last in range of communication with the emergency authorities to permit the vehicle communication module to communicate with the emergency authorities by way of the aerial drone.

* * * * *